United States Patent
Ohta et al.

(10) Patent No.: US 9,849,984 B2
(45) Date of Patent: Dec. 26, 2017

(54) LIGHTING APPARATUS WITH OPTICAL MEMBER HAVING ASYMMETRIC LIGHT INCIDENT SURFACE

(71) Applicant: PANASONIC CORPORATION, Osaka (JP)

(72) Inventors: Takashi Ohta, Osaka (JP); Tadashi Murakami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 275 days.

(21) Appl. No.: 14/250,888

(22) Filed: Apr. 11, 2014

(65) Prior Publication Data

US 2014/0307453 A1 Oct. 16, 2014

(30) Foreign Application Priority Data

Apr. 12, 2013 (JP) .................. 2013-083853

(51) Int. Cl.
*F21V 1/00* (2006.01)
*F21V 11/00* (2015.01)
(Continued)

(52) U.S. Cl.
CPC .............. *B64D 11/00* (2013.01); *F21V 5/04* (2013.01); *F21V 5/08* (2013.01); *G02B 19/0061* (2013.01);
(Continued)

(58) Field of Classification Search
CPC ........ B64D 2203/00; B64D 2011/0038; B64D 47/02; B64D 11/001; F21V 5/04;
(Continued)

(56) References Cited

U.S. PATENT DOCUMENTS 2,356,654 A * 8/1944 Cullman .................. F21V 5/04
200/84 C
5,343,330 A * 8/1994 Hoffman .................. F21S 11/00
359/708
(Continued)

FOREIGN PATENT DOCUMENTS

DE 102011085289 A1 * 1/2013 .............. F21V 5/007
JP H07-36459 U 7/1995
(Continued)

OTHER PUBLICATIONS

U.S. Appl. No. 14/250,908 to Tadasi Nisimura et al., filed Apr. 11, 2014.
(Continued)

*Primary Examiner* — Erin Kryukova
(74) *Attorney, Agent, or Firm* — Greenblum & Bernstein, P.L.C.

(57) ABSTRACT

A lighting apparatus includes a plurality of LEDs arranged in a row on an elongated wiring board; and a lens covering all the LEDs and controlling distribution of light emitted from each LED. An optical axis of the light emitted from each LED is orthogonal to the wiring board. The lens has a light emitting surface that controls distribution of the light emitted from each LED. When the light emitting surface is divided into at least three regions, the lens performs light distribution such that light radiated from a region is distributed in a direction tilted with respect to the optical axis of the light emitted from the LED. Thus, asymmetric distribution of light is achieved when the optical axis of the light from the LED is the axis of symmetry, and further, the luminous flux in the direction tilted with respect to the optical axis is increased most.

3 Claims, 6 Drawing Sheets

(51) Int. Cl.
*F21V 5/00* (2015.01)
*F21V 3/00* (2015.01)
*B64F 1/20* (2006.01)
*F21V 1/20* (2006.01)
*F21V 21/00* (2006.01)
*B64D 11/00* (2006.01)
*F21V 5/04* (2006.01)
*G02B 19/00* (2006.01)
*F21V 5/08* (2006.01)

(52) U.S. Cl.
CPC .. *B64D 2011/0038* (2013.01); *B64D 2203/00* (2013.01); *Y02T 50/46* (2013.01)

(58) Field of Classification Search
CPC .......... F21V 5/043; F21V 5/045; F21V 5/048; F21V 5/08; F21V 7/005; F21V 7/04; F21V 7/043; F21S 4/20; F21W 2101/06; F21Y 2103/003; F21Y 2103/10; G02B 19/0028; G02B 19/00; G02B 19/0066; G02B 19/006
USPC .......................................... 362/223, 470–742
See application file for complete search history.

(56) References Cited

U.S. PATENT DOCUMENTS

| | | | |
|---|---|---|---|
| 6,940,660 B2* | 9/2005 | Blumel | F21V 5/007 359/726 |
| 7,204,622 B2 | 4/2007 | Dowling et al. | |
| 9,200,765 B1* | 12/2015 | Broughton | F21K 9/54 |
| 9,239,141 B1* | 1/2016 | Schertler | G09F 13/02 |
| 9,316,378 B2* | 4/2016 | Ebner | F21V 5/007 |
| 2004/0090787 A1 | 5/2004 | Dowling et al. | |
| 2004/0105171 A1* | 6/2004 | Minano | G02B 3/08 359/728 |
| 2006/0164833 A1* | 7/2006 | Parkyn | F21V 5/04 362/235 |
| 2007/0086204 A1* | 4/2007 | Chinniah | F21V 5/04 362/520 |
| 2007/0153514 A1 | 7/2007 | Dowling et al. | |
| 2011/0204242 A1* | 8/2011 | Hoch | G02B 27/30 250/363.1 |
| 2012/0287511 A1 | 11/2012 | Dross et al. | |
| 2013/0051057 A1 | 2/2013 | Okubo | |
| 2013/0208473 A1* | 8/2013 | Palagashvili | B64D 11/00 362/246 |
| 2013/0223072 A1* | 8/2013 | Castillo | F21V 5/04 362/245 |
| 2014/0313742 A1* | 10/2014 | Ebner | F21V 5/007 362/311.02 |

FOREIGN PATENT DOCUMENTS

| | | |
|---|---|---|
| JP | 2005-537613 | 12/2005 |
| JP | 2011-148406 A | 8/2011 |
| JP | 2012-017090 A | 1/2012 |
| JP | 2013-45604 A | 3/2013 |
| JP | 2013-51167 A | 3/2013 |
| WO | 2004/021747 | 3/2004 |

OTHER PUBLICATIONS

U.S. Appl. No. 14/250,900 to Youji Tachino et al., filed Apr. 11, 2014.
U.S. Appl. No. 14/250,882 to Takashi Ohta et al., filed Apr. 11, 2014.

* cited by examiner

GENERAL CONVERGING LENS

LUMINOUS INTENSITY DISTRIBUTION CURVE DUE TO LENS 6'

LENS ACCORDING TO EMBODIMENT

LUMINOUS INTENSITY DISTRIBUTION CURVE DUE TO LENS 6

REFLECTION MIRROR ACCORDING TO EMBODIMENT

GENERAL REFLECTION MIRROR

LIGHTING APPARATUS WITH OPTICAL MEMBER HAVING ASYMMETRIC LIGHT INCIDENT SURFACE

FIELD OF THE INVENTION

The present invention relates to a lighting apparatus that illuminates a ceiling in a cabin of an aircraft.

BACKGROUND OF THE INVENTION

Examples of lighting apparatuses provided in a cabin of an aircraft include: lighting apparatuses provided at a floor surface of an aisle at prescribed intervals; lighting apparatuses that locally illuminate passenger seats for passengers reading books or the like; and lighting apparatuses that illuminate a ceiling above the aisle. Among these lighting apparatuses, the brightness in the cabin is mainly controlled by the lighting apparatuses that illuminate the ceiling above the aisle.

In recent years, for improvement of fuel efficiency of aircraft, not only the body of the aircraft but also various apparatuses installed in the cabin of the aircraft are required to be reduced in weight. For this purpose, a lighting apparatus for use in the cabin of an aircraft, which adopts LEDs as light sources, has been known (refer to Patent Document 1, for example). In particular, many lighting apparatuses for illuminating the ceiling above the aisle are provided over the entire length of the cabin, and therefore, using compact and lightweight LEDs as light sources of each lighting apparatus contributes to reduction in the total weight of the aircraft.

FIG. 9 is a diagram showing an example of installation of lighting apparatuses of this type. In FIG. 9, lighting apparatuses 101 and 102 are used for illuminating a ceiling C above an aisle P in a cabin of an aircraft AP, and are provided above and along one side and the other side of the aisle P, respectively. The lighting apparatuses 101 and 102 are mounted to upper ends of overhead storage bins SRp and SRw above an aisle-side seat Sp and a window-side seat Sw, respectively, so as to be invisible from passengers sitting in the seats Sp and Sw. In FIG. 9, dashed arrows indicate optical axis directions of illuminating light emitted from the lighting apparatuses 101 and 102.

CITATION LIST

Patent Document

Patent Document 1: Japanese Laid-Open Patent Publication (Translation of PCT Application) No. 2005-537613

BRIEF SUMMARY OF THE INVENTION

Problems to be Solved by the Invention

However, when two rows of lighting apparatuses 101 and 102 are provided for one aisle P as shown in FIG. 9, the total weight of the lighting apparatuses is great, and the total weight of the aircraft AP is increased by that weight, resulting in poor fuel efficiency of the aircraft AP. However, if each lighting apparatus 101 is mounted to the upper end of only the window-side storage bin SRw as shown in FIG. 10, the optical path length is increased in a direction L from the lighting apparatus 101 to the ceiling C in the vicinity of the aisle-side storage bin SRp, and therefore, the area in the vicinity of the aisle-side storage bin SRp becomes dark. On the other hand, if an optical member having high convergence property is used in the lighting apparatus 101, the ceiling C in the vicinity of the aisle-side storage bin SRp can be made bright. In this case, however, the beam angle of illuminating light is narrowed, and thereby the ceiling in the vicinity of the window-side storage bin SRw becomes dark.

The present invention has been made to solve the above problems, and an object of the present invention is to provide a lighting apparatus that can effectively illuminate the interior of a cabin of an aircraft even if less number of the lighting apparatuses than are conventionally used are provided in the cabin, and can contribute to reduction in the total weight of the aircraft and improvement of fuel efficiency.

Solution to the Problems

The present invention relates to a lighting apparatus that illuminates a ceiling above an aisle in a cabin of an aircraft in which the aisle extends along a traveling direction of the aircraft. The lighting apparatus includes: a plurality of LEDs arranged in a row; a wiring board having an elongated shape, on which the LEDs are mounted; and an optical member that covers all the LEDs and controls distribution of light emitted from each of the LEDs. The light emitted from each LED has an optical axis orthogonal to the wiring board. The optical member has a light emitting surface that controls distribution of the light emitted from each LED and emits the light. When the light emitting surface is divided into at least three regions, the optical member performs light distribution such that light radiated from a region, among the at least three regions, through which the optical axis of the light emitted from the LED passes, is distributed in a direction tilted with respect to the optical axis of the light emitted from the LED, as viewed at a cross section orthogonal to a longitudinal direction of the wiring board.

In the above lighting apparatus, preferably, the optical member performs light distribution such that light radiated from, among the at least three regions, a region around the region through which the optical axis of the light emitted from the LED passes is distributed in a direction parallel to the optical axis of the light emitted from the LED, as viewed at the cross section orthogonal to the longitudinal direction of the wiring board.

In the above lighting apparatus, preferably, the optical member is an optical lens having a light incident surface on which the light emitted from the LED is incident, and the light incident surface is asymmetric with respect to the optical axis of the light emitted from the LED.

In the above lighting apparatus, preferably, the light incident surface of the optical lens is a curved surface convex toward the wiring board, and a most projected portion of the curved surface deviates from the optical axis of the light emitted from the LED.

In the above lighting apparatus, preferably, the light incident surface of the optical lens has a sawtooth-like prism surface at one of two parts into which the light incident surface is divided with respect to the optical axis of the light emitted from the LED, as viewed at the cross section orthogonal to the longitudinal direction of the wiring board.

In the above lighting apparatus, preferably, the optical member is a reflection mirror having a reflection surface that reflects the light emitted from the LED, and the reflection surface is asymmetric with respect to the optical axis of the light emitted from the LED.

Effects of the Invention

According to the present invention, since the optical member distributes the light emitted from the LED in the direction tilted with respect to the optical axis of the light, asymmetric distribution of light is achieved when the optical axis of the light emitted from the LED is the axis of symmetry. Further, the luminous flux in the direction tilted with respect to the optical axis is increased most. Therefore, for example, if the lighting apparatus is provided above and along one side of the aisle in the cabin, light emitted from the lighting apparatus can uniformly illuminate not only an area in the vicinity of the side where the lighting apparatus is provided but also an area in the vicinity of the other side of the aisle. Accordingly, it is possible to effectively illuminate the interior of the cabin with less number of lighting apparatuses as compared to the case where the lighting apparatuses are provided above and along both sides of the aisle. Furthermore, the reduction in the number of the lighting apparatuses contributes to reduction in the total weight of the aircraft, and improvement of fuel efficiency.

DETAILED DESCRIPTION OF THE INVENTION

Figure 1:
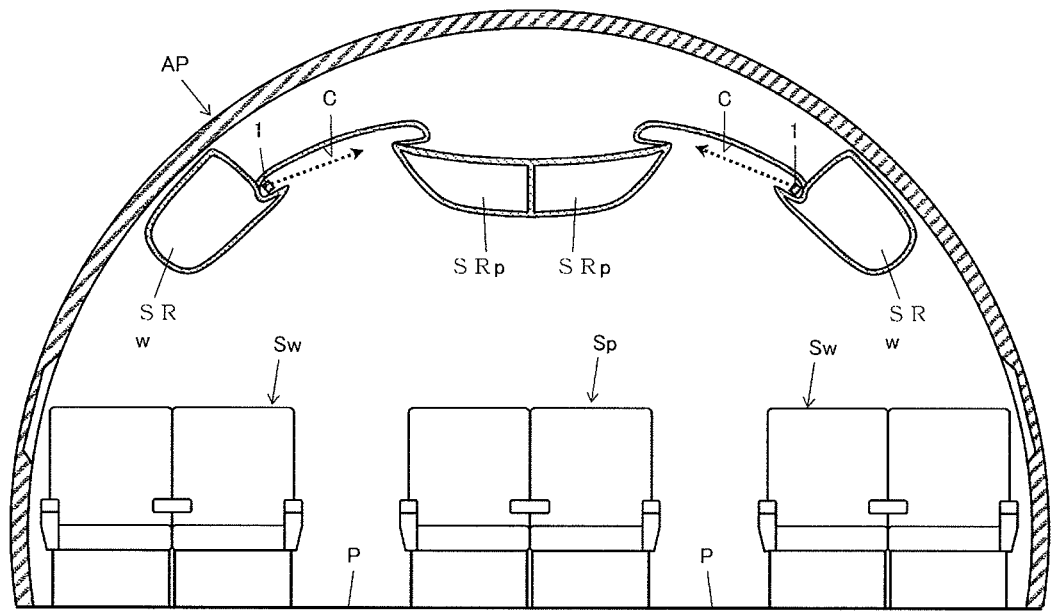
FIG. 1 is a cross sectional view showing the interior of a cabin of an aircraft in which lighting apparatuses according to a first embodiment of the present invention are installed.

A lighting apparatus according to a first embodiment of the present invention will be described with reference to FIGS. 1 to 6. As shown in FIG. 1, lighting apparatuses 1 are used for illuminating a ceiling C inside a cabin of an aircraft AP. The lighting apparatuses 1 are mounted to upper ends of overhead storage bins SRp and SRw located above an aisle-side seat Sp and a window-side seat Sw, respectively, along each of two passenger aisles P extending in the traveling direction of the aircraft AP. In FIG. 1, dashed arrows indicate optical axis directions of illuminating light emitted from the lighting apparatuses 1.

Figure 2:
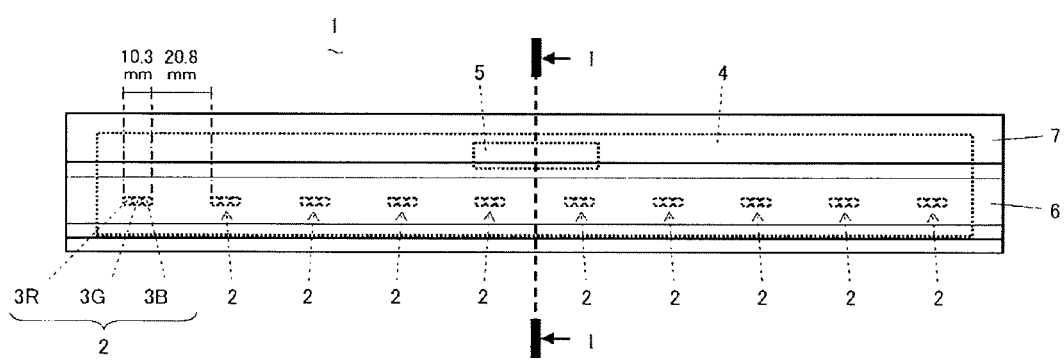
FIG. 2 is a top view of the lighting apparatus.

As shown in FIG. 2, each lighting apparatus 1 has an elongated shape, and includes a plurality of LED units 2 arranged linearly. In FIG. 2, for example, ten LED units 2 are arranged at intervals of 20.8 mm. Each LED unit 2 includes three or more LEDs 3 arranged in a row. In FIG. 2, for example, a red LED 3R, a green LED 3G, and a blue LED 3B are arranged at intervals of 0.5 mm such that the length of the LED unit 2 is 10.3 mm in the direction along which the LEDs 3 are arranged. Since the LED units 2 and the LEDs 3 are arranged as described above, efficient mixing of light is achieved between the LED units 2 as well as among the LEDs 3 in each LED unit 2.

Figure 3:
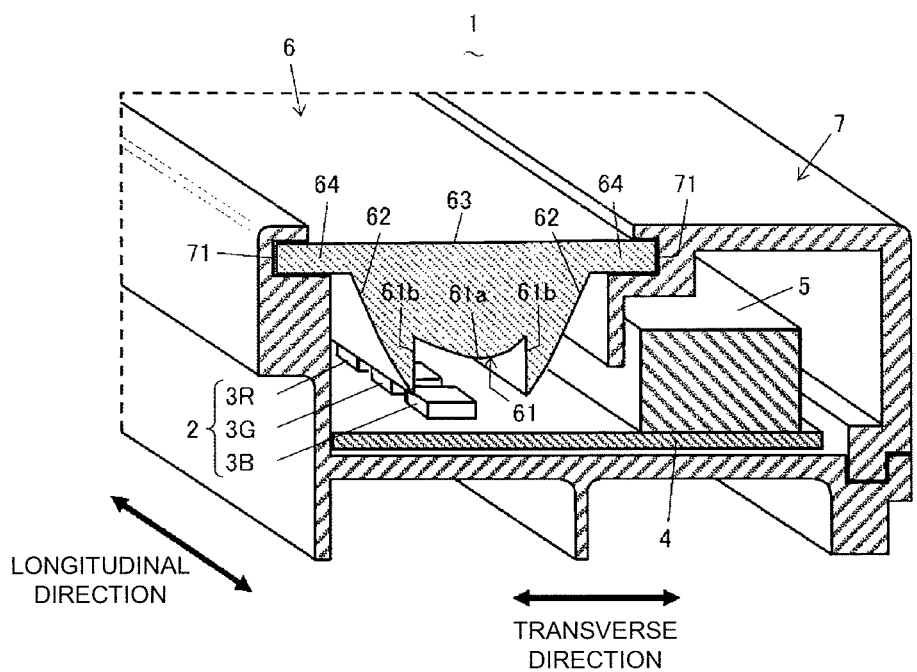
FIG. 3 is a perspective view including a cross section taken along a line I-I in FIG. 2.

As shown in FIG. 3, the lighting apparatus 1 includes: a wiring board 4 on which the LED units 2 are mounted; a drive circuit 5, mounted on the wiring board 4, for driving the LED units 2; and an optical member (optical lens; hereinafter referred to as "lens 6") for controlling distribution of light emitted from each LED unit 2. In addition, the lighting apparatus 1 includes a frame 7 that holds the above-mentioned components. The drive circuit 5 includes drivers (not shown) for individually driving the red LED 3R, the green LED 3G, and the blue LED 3B, respectively.

The lens 6 has an elongated shape that covers all the ten LEDs unit 2, and has a recess 61 at a surface thereof opposed to the LED units 2 (refer to FIG. 3). The recess 61 has a bottom surface serving as a first light incident surface 61a on which light emitted from each LED unit 2 in the forward direction is incident, and has side surfaces of a cylindrical shape, serving as second light incident surfaces 61b on which light emitted at a wide angle from each LED unit 2 is incident. Among the light incident surfaces 61a and 61b, the first light incident surface 61a is asymmetric with respect to the optical axis of the light emitted from the LED unit 2. In addition, the lens 6 has total reflection surfaces 62 that are provided opposed to the second light incident surfaces 61b and totally reflect the light incident from the second light incident surfaces 61b, and has a light emitting surface 63 that emits the light totally reflected by the total reflection surfaces 62 and the light incident from the first light incident surface 61a.

The first light incident surface 61a is formed to be convex toward the LED units 2. The configurations of the first light incident surface 61a, the second light incident surfaces 61b, and the total reflection surfaces 62 will be described later in detail. The light emitting surface 63 is a planar surface, and transmits and emits the light from the first light incident surface 61a and the light from the total reflection surfaces 62. Further, the lens 6 has a pair of flange portions 64 extending outward from both ends of the lens 6 in the transverse direction. The pair of flange portions 64 is slidingly inserted in a pair of grooves 71 provided along the longitudinal direction of the frame 7, and thus the lens 6 is detachably mounted to the frame 7.

Figure 4:
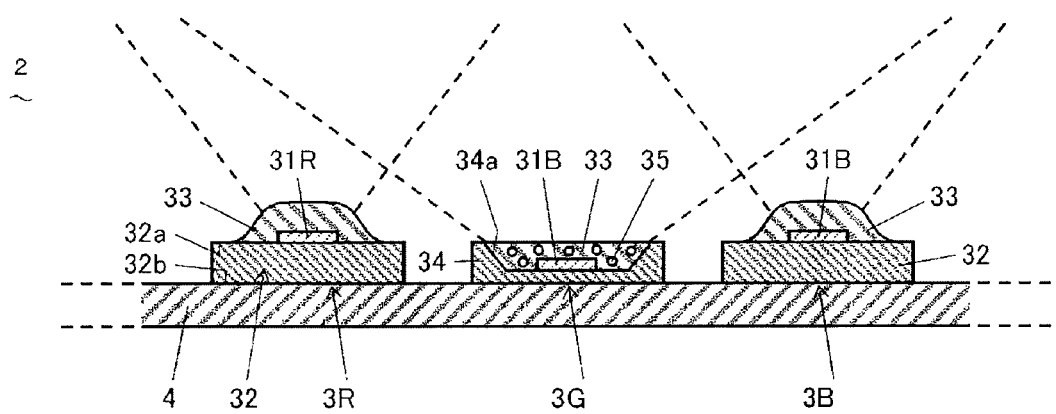
FIG. 4 is a cross sectional view of an LED unit as a component of the lighting apparatus.

As shown in FIG. 4, the red LED 3R includes a red LED chip 31R that emits red light, a base 32 on which the red LED chip 31R is mounted, and an encapsulant 33 that encapsulates the red LED chip 31R. The red LED 3R is mounted on the wiring board 4 via a mounting surface 32b of the base 32 on the side opposite to an LED-chip-mounted surface 32a of the base 32. The base 32 has a wiring (not shown) having one end connected to the red LED chip 31R and the other end led from the mounting surface 32b. The wiring led from the mounting surface 32b is connected to a wiring pattern (not shown) on the wiring board 4. The base 32 is formed of a material excellent in heat conductivity and heat resistance, such as aluminum or ceramics.

The blue LED 3B is configured in the same manner as the red LED 3R, except having a blue LED chip 31B that emits blue light, instead of the red LED chip 31R.

The green LED 3G includes a blue LED chip 31B, a base 34 on which the blue LED chip 31B is mounted, and green phosphor 35 that is dispersed in the encapsulant 33 and performs wavelength conversion of blue light to green light. The base 34 has a recess 34a at the center thereof, and the blue LED chip 31B is disposed on the bottom surface of the recess 34a. Like the base 32 of the red LED 3R and the blue LED 3B, the base 34 also has a wiring (not shown), and the wiring connects the blue LED chip 31B to the wiring pattern (not shown) on the wiring board 4.

Generally, a green LED chip that emits green light has lower energy-to-light conversion efficiency and lower emission luminance than a blue LED chip or the like. The green LED 3G configured by the use of the blue LED chip 31B and the green phosphor 35 as described above has improved energy-to-light conversion efficiency and improved emission luminance as compared to a green LED configured by the use of a green LED chip.

The red LED 3R and the blue LED 3B configured as described above each have a relatively narrow light distribution angle (e.g., 80°), like a general LED. In contrast, the green LED 3G has a relatively wide light distribution angle (e.g., 120°) because the entirety of the encapsulant 33 including the green phosphor 35 acts like a light source that emits green light. The green LED 3G having the wide light distribution angle is disposed in the center (at an inner position) in the row of the LEDs 3 in the LED unit 2, and the red LED 3R and the blue LED 3B having the narrow light distribution angle are disposed at both ends of the row of the LEDs 3.

According to the above configuration, since the green LED 3G having the wide light distribution angle is disposed in the center, green light emitted from the green LED 3G is effectively mixed with red light and blue light emitted from the red LED 3R and the blue LED 3B adjacent to the green LED 3G. Therefore, color unevenness of illuminating light can be reduced. Further, since the drive circuit 5 individually drives the respective LEDs 3, the color of illuminating light emitted from the lighting apparatus 1 can be arbitrary controlled. Accordingly, it is possible to perform various kinds of artificial lighting, such as producing an atmosphere of early morning by illuminating the ceiling in the cabin with pale light, and producing an atmosphere of twilight by illuminating the ceiling with orange light.

Figure 5A:
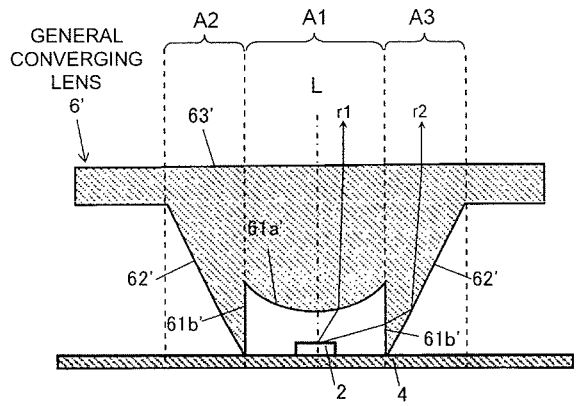
FIG. 5A is a side sectional view of a converging lens used in a general lighting apparatus.
Figure 5B:
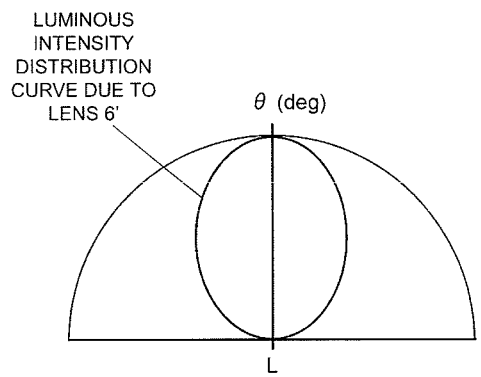
FIG. 5B is a diagram showing a luminous intensity distribution curve in the converging lens.

FIG. 5A is a side sectional view of a general converging lens 6'. An optical axis L of light emitted from an LED unit 2 is orthogonal to a wiring board 4. At the cross section shown in FIG. 5A, when a light emitting surface 63' of the converging lens 6' is divided into at least three regions A1 to A3, a first light incident surface 61a' is provided at a position confronting the region A1 through which the optical axis L of light emitted from the LED unit 2 passes. The center of the first light incident surface 61a' is most projected toward the LED unit 2, and the most-projected portion overlaps with the optical axis L of the light emitted from the LED unit 2. This configuration allows the first light incident surface 61a' to refract the incident light r1 from the LED unit 2 in a direction parallel to the optical axis L of the light emitted from the LED unit 2. Further, total reflection surfaces 62' are provided at positions confronting the regions A2 and A3 adjacent to the region A1. The total reflection surfaces 62' are each designed to totally reflect the light refracted at a second light incident surface 61b', and distribute the reflected light r2 in a direction orthogonal to the light emitting surface 63'. Therefore, according to the converging lens 6', as shown in FIG. 5B, symmetric distribution of light is obtained when the optical axis L of the light emitted from the LED unit 2 is the axis of symmetry, and further, the luminous flux in the vicinity of the optical axis L is increased most.

Figure 5C:
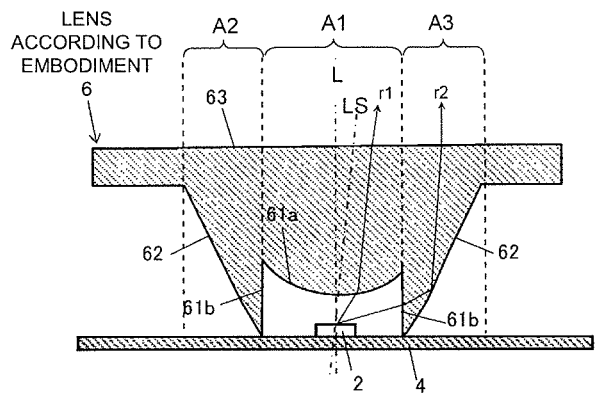
FIG. 5C is a side sectional view of a lens used in the lighting apparatus according to the present embodiment.

FIG. 5C is a side sectional view of the lens 6 of the present embodiment. At the cross section shown in FIG. 5C (the cross section orthogonal to the longitudinal direction of the wiring board (refer to FIG. 3)), when the light emitting surface 63 is divided into at least three regions A1 to A3, the first light incident surface 61a is provided at a position confronting the region A1 through which the optical axis L of the light emitted from the LED unit 2 passes. The first light incident surface 61a is a curved surface convex toward the wiring board 4, and a most projecting portion of the curved surface deviates from the optical axis L of the light from the LED unit 2. Therefore, the first light incident surface 61a refracts the light radiated from the region A1 in a direction LS tilted with respect to the optical axis L of the light emitted from the LED unit 2. On the other hand, the total reflection surfaces 62 are provided at positions confronting the regions A2 and A3 adjacent to the region A1. The total reflection surfaces 62 have the same shapes as the total reflection surfaces 62' of the general converging lens 6', and distribute the light radiated from the regions A2 and A3 in a direction parallel to the optical axis L of the light emitted from the LED unit 2.

Figure 5D:
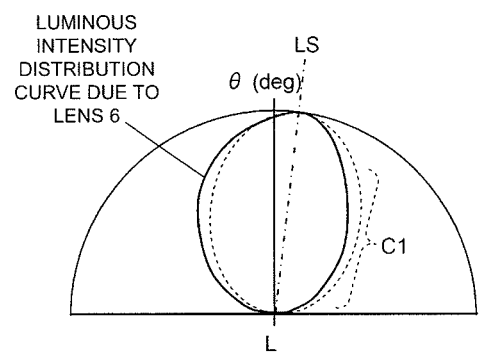
FIG. 5D is a diagram showing a luminous intensity distribution curve in the lens.
Figure 6:
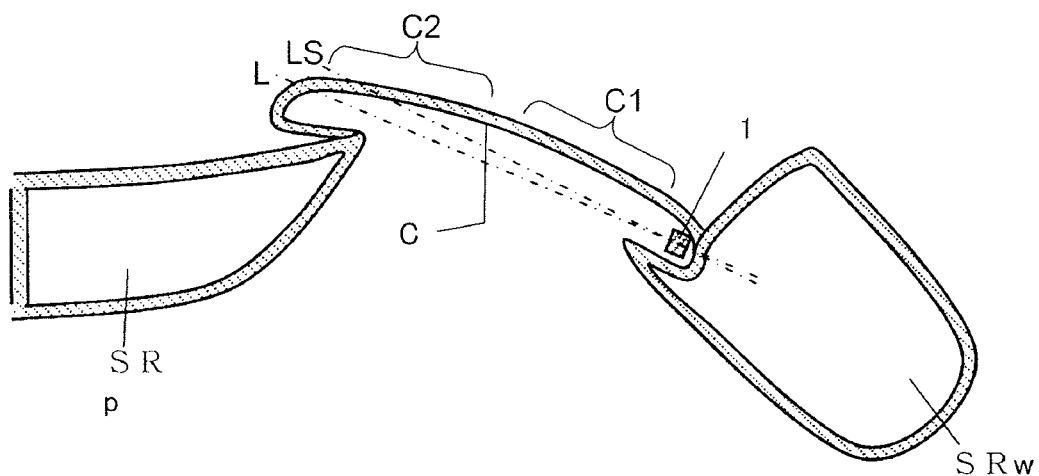
FIG. 6 is a partially-enlarged sectional view showing how the lighting apparatus is mounted.

Therefore, as shown in FIG. 5D, the lens 6 can distribute the light emitted from the LED unit 2 in the direction LS tilted with respect to the optical axis L, and thereby the luminous flux in the direction LS can be increased. As a result, asymmetric distribution of light is achieved when the optical axis L of the light emitted from the LED unit 2 is the axis of symmetry. Further, the luminous flux is increased most at an angle tilted relative to the optical axis L. A dashed line in FIG. 5D indicates distribution of light when the general converging lens 6' is simply tilted. In this case, although the luminous flux in the direction LS tilted with respect to the optical axis L can be increased, the distribution of light in a wide angle region (region C1 in FIG. 5D) is also increased. Therefore, as shown in FIG. 6, an area C1, near the window-side storage bin SRw, of the ceiling C above the aisle in the cabin of the aircraft might be illuminated excessively brightly.

In contrast, according to the lens 6 of the present embodiment, when the light emitting surface 63 is divided into three regions A1 to A3, light radiated from the region A1 through which the optical axis L of the light emitted from the LED unit 2 passes is distributed in the direction LS tilted with respect to the optical axis L, while light parallel to the optical axis L is radiated from each of the regions A2 and A3 adjacent to the region A1. Therefore, the luminous flux in the direction LS is increased, whereas the distribution of light in the wide angle region is hardly changed Therefore, according to the lighting apparatus 1, an area C2 near the aisle-side storage bin SRp can be brightly illuminated while the area C1 near the window-side storage bin SRw is not illuminated excessively brightly. Further, light emitted from the lighting apparatus 1 provided above and along one side of the aisle can uniformly illuminate not only the area C1 of the ceiling C near the window-side storage bin SRw but also the area C2 of the ceiling C near the aisle-side storage bin SRp. Accordingly it is possible to effectively illuminate the interior of the cabin with less number of lighting apparatuses as compared to the case where lighting apparatuses are provided above and along both sides of each aisle, and the reduction in the number of the lighting apparatuses contributes to reduction in the total weight of the aircraft and improvement of fuel efficiency.

Next, lighting apparatuses according to modifications of the present embodiment will be described with reference to FIGS. 7A and 7B. In the modification shown in FIG. 7A, the first light incident surface 61a of the lens 6 has a sawtooth-like prism surface 61c at one of two parts into which the first light incident surface 61a is divided at the optical axis L of the light emitted from the LED unit 2, as viewed at a cross section orthogonal to the longitudinal direction of the wiring board 4. The other part of the first light incident surface 61a is identical to that of the conventional converging lens 6' (refer to FIGS. 5A and 5B). The sawtooth-like prism surface 61c refracts and totally reflects light r3 emitted from the LED unit 2 to distribute the light r3 in a direction LS tilted with respect to the optical axis L. On the other hand, in the modification shown in FIG. 7B, the lens 6 has Fresnel surfaces 61d at positions confronting the regions A2 and A3. Each Fresnel surface 61d distributes light r2 incident on the Fresnel surface 61d in a direction parallel to the optical axis L, like the second light incident surface 61b and the total reflection surface 62 of the above embodiment. Further, a first light incident surface 61a is provided at a position confronting the region A1 like the above embodiment, and the first light incident surface 61a distributes incident light r1 in a direction LS tilted with respect to the optical axis L.

Figure 7A:
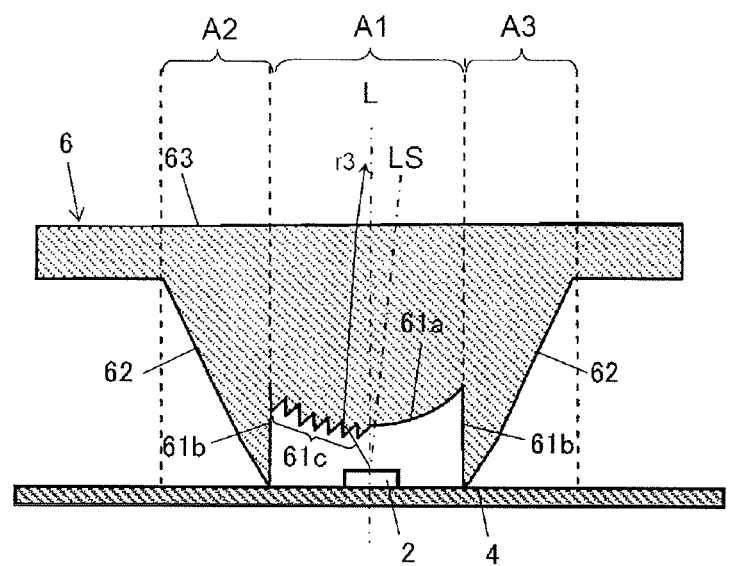
FIGS. 7A and 7B are cross sectional views of lenses used in lighting apparatuses according to modifications of the first embodiment.
Figure 7B:
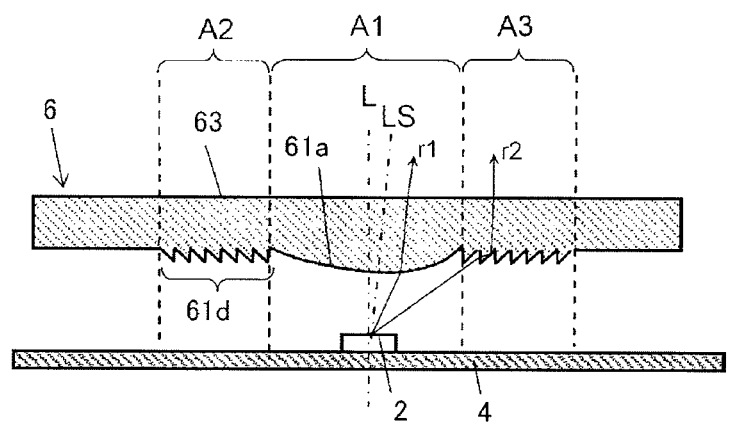

As a result, also in the modifications shown in FIGS. 7A and 7B, distribution of light similar to that shown in FIG. 5D can be obtained. In FIG. 7A, the angle of the direction LS tilted with respect to the optical axis L can be increased as the angle of sloped portions of the sawtooth shape of the prism surface 61c is increased. Further, since the Fresnel surfaces 61d are used, the thickness of the lens 6 is reduced as shown in FIG. 7B, thereby realizing weight reduction of the lens 6 and size reduction on the lighting apparatus 1.

Figure 8A:
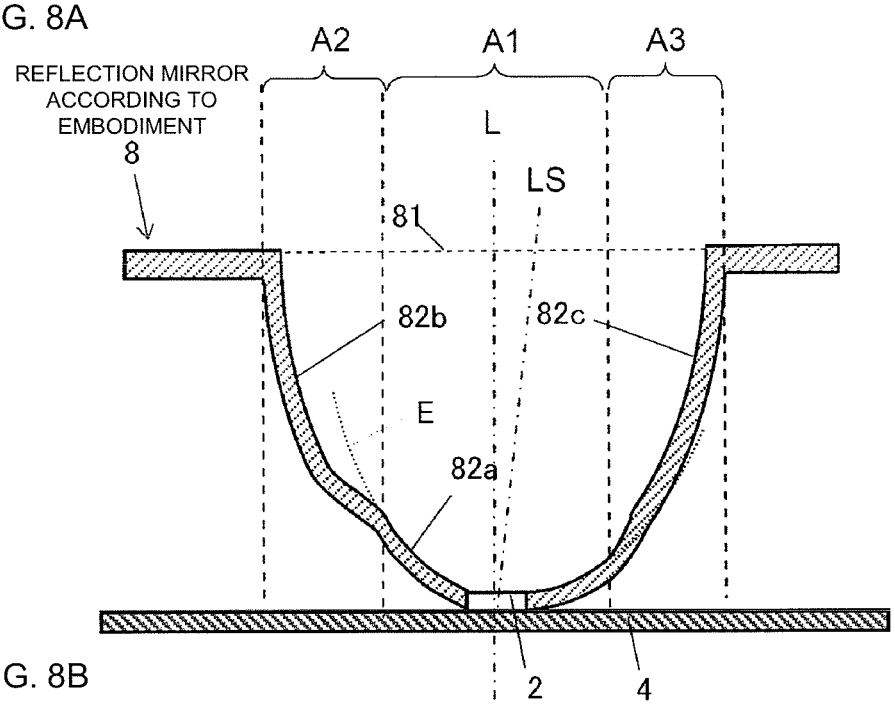
FIG. 8A is a side sectional view showing a reflection mirror used in a lighting apparatus according to a second embodiment of the present invention.
Figure 8B:
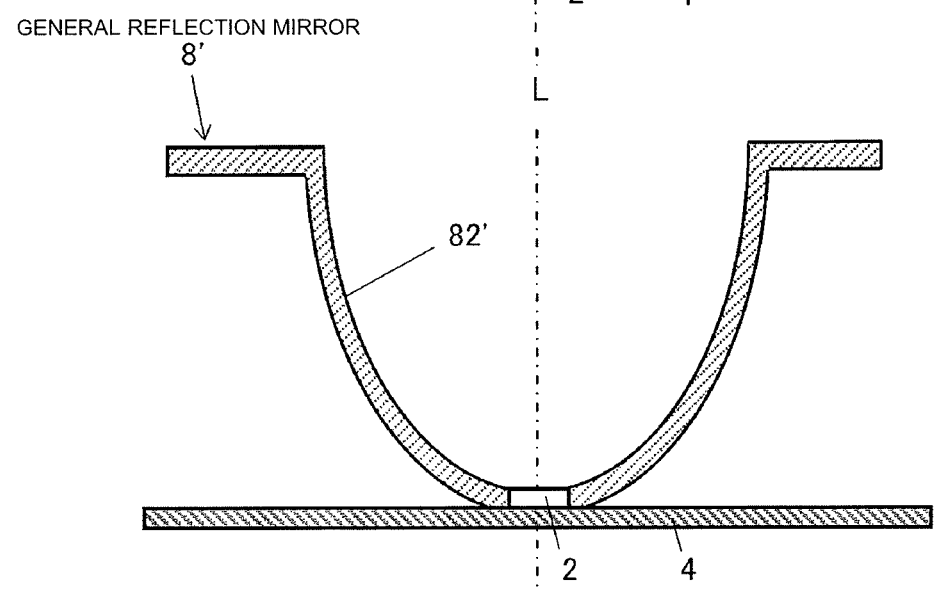
FIG. 8B is a side sectional view of a general reflection mirror.
Figure 9:
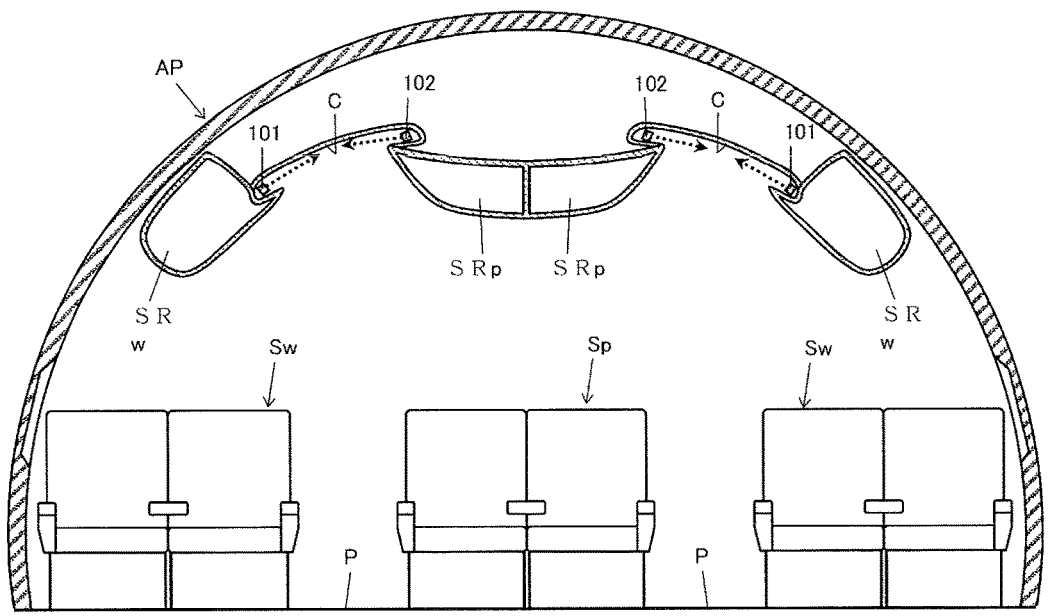
FIG. 9 is a cross sectional view showing the interior of a cabin of an aircraft in which general lighting apparatuses are installed.
Figure 10:
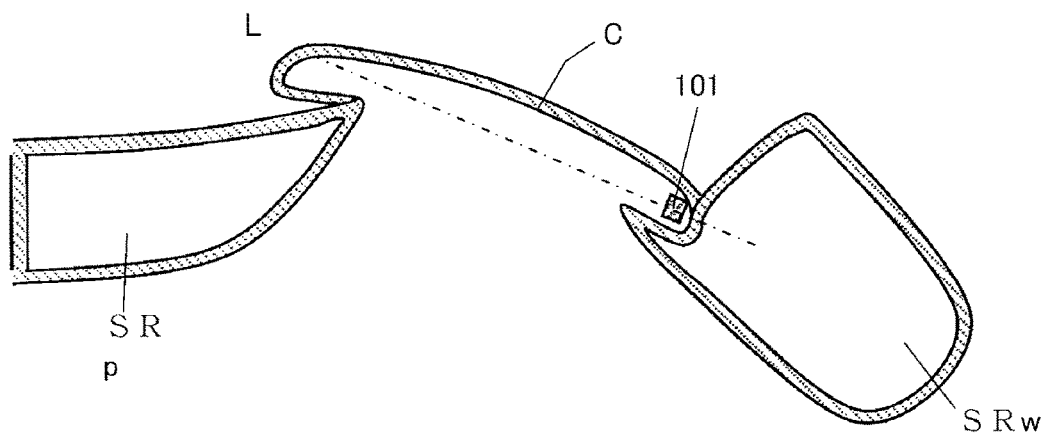
FIG. 10 is a partially-enlarged sectional view showing how a general lighting apparatus is mounted.

Next, a lighting apparatus according to a second embodiment of the present invention will be described with reference to FIGS. 8A and 8B. As shown in FIG. 8A, the lighting apparatus according to the second embodiment adopts, as an optical member, a reflection mirror 8 instead of the lens 6 used in the above embodiment. Also in the second embodiment, when a light emitting surface (aperture) 81 that controls distribution of light emitted from an LED unit 2 and emits the light is divided into at least three regions A1 to A3, light radiated from the region A1 through which the optical axis L passes is distributed in a direction LS tilted with respect to the optical axis L. Specifically, a reflection surface 82a located in the region A1 has a cross sectional shape of a semi-ellipse E that is asymmetric with respect to the optical axis L, and has a long side in the direction LS tilted with respect to the optical axis L. On the other hand, reflection surfaces 82b and 82c located in the regions A2 and A3, respectively, are symmetric with respect to the optical axis L. The reflection surface 82a is smoothly connected to the reflection surfaces 82b and 82c, and portions of the reflection surfaces 82b and 82c in the vicinity of the connection portions are not necessarily symmetric with respect to the optical axis L. FIG. 8B shows, for comparison, a reflection mirror 8' in which a reflection surface 82' is symmetric with respect to the optical axis L.

Also in the lighting apparatus of the second embodiment, like in the first embodiment, distribution of light similar to that shown in FIG. 5D can be achieved by the use of the reflection mirror 8. As a result, as shown in FIG. 6, when the lighting apparatus is provided above and along one side of each aisle in the cabin, light emitted from the lighting apparatus uniformly illuminates not only the area in the vicinity of the side where the lighting apparatus is provided but also the area in the vicinity of the other side. Accordingly, the interior of the cabin can be effectively illuminated with less number of lighting apparatuses as compared to the case where lighting apparatuses are provided above and along both sides of each aisle, and the reduction in the number of the lighting apparatus contributes to reduction in the total weight of the aircraft and improvement of fuel efficiency.

The lighting apparatus according to the present invention is not limited to the above embodiments and the modifications thereof, and may be modified in various manners. For example, the lighting apparatus may include an LED that emits light of a color other than RGB. Specifically, the lighting apparatus may include a white LED that emits white light in addition to the RGB LEDs, and these LEDs may be individually subjected to dimming control. Since the lighting apparatus of the present invention is configured such that a difference in luminance according to a difference in optical path length hardly occurs between an area near the lighting apparatus and an area far from the lighting apparatus, the lighting apparatus is also applicable to an aircraft having a single aisle. However, in the case of a single aisle, symmetry of illumination is strongly demanded. Further, in terms of right and left weight balance of the aircraft, the lighting apparatus is preferably applied to an aircraft having two aisles.

DESCRIPTION OF REFERENCE CHARACTERS 1 lighting apparatus
2 LED unit
3 LED
4 wiring board
6 lens (optical lens; optical member)
61a first light incident surface
61b second light incident surface
8 reflection mirror (optical member)
A1, A2, A3 regions
L optical axis
LS direction tilted with respect to optical axis

The invention claimed is:
1. A lighting apparatus that illuminates a ceiling above an aisle in a cabin of an aircraft, the aisle extending along a traveling direction of the aircraft, the lighting apparatus comprising:
a plurality of LEDs arranged in a row;
a wiring board having an elongated shape, on which the plurality of LEDs are mounted; and
an optical member that covers all of the plurality of LEDs and controls distribution of light emitted from each LED of the plurality of LEDs, wherein
the light emitted from the each LED has an optical axis orthogonal to the wiring board,
the optical member is an optical lens having a light incident surface on which the light emitted from the each LED is incident, and the light incident surface extends convexly toward the each LED and is partially asymmetric with respect to the optical axis of the light emitted from the each LED,
the optical member has a light emitting surface that emits the light whose distribution of the light emitted from the each LED is controlled, and when the light emitting surface is divided into at least three regions, the optical member performs light distribution such that light radiated from a region, among the at least three regions, through which the optical axis of the light emitted from the each LED passes, is distributed in a direction tilted with respect to the optical axis of the light emitted from the each LED, the optical member performs light distribution such that light radiated from, among the at least three regions, a second region around the region through which the optical axis of the light emitted from the each LED passes is distributed in a direction parallel to the optical axis of the light emitted from the each LED as viewed at a cross section orthogonal to a longitudinal direction of the wiring board, and the cross sectional shape of the optical member is the same in any portion as viewed in the cross section orthogonal to the longitudinal direction.

2. The lighting apparatus according to claim 1, wherein the light incident surface of the optical lens is a curved surface convex toward the wiring board, and a most projected portion of the curved surface deviates from the optical axis of the light emitted from the each LED.

3. The lighting apparatus according to claim 1, wherein the light incident surface of the optical lens has a sawtooth-like prism surface at one of two parts into which the light incident surface is divided with respect to the optical axis of the light emitted from the each LED, as viewed at the cross section orthogonal to the longitudinal direction of the wiring board.

* * * * *